Aug. 27, 1957     J. R. OISHEI     2,804,261
ACCESSORY SYSTEM AND ROTARY PUMP THEREFOR
Filed Dec. 22, 1952     2 Sheets-Sheet 1
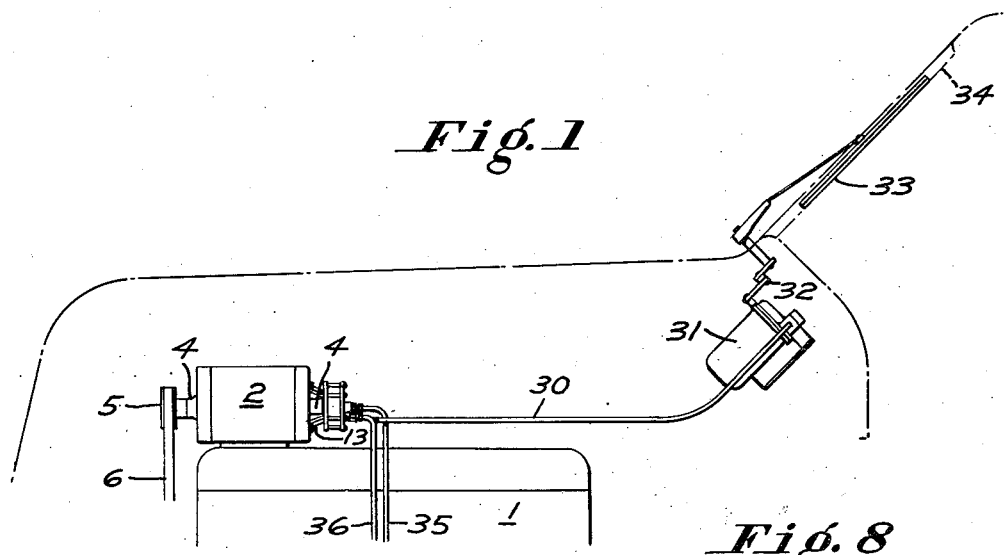
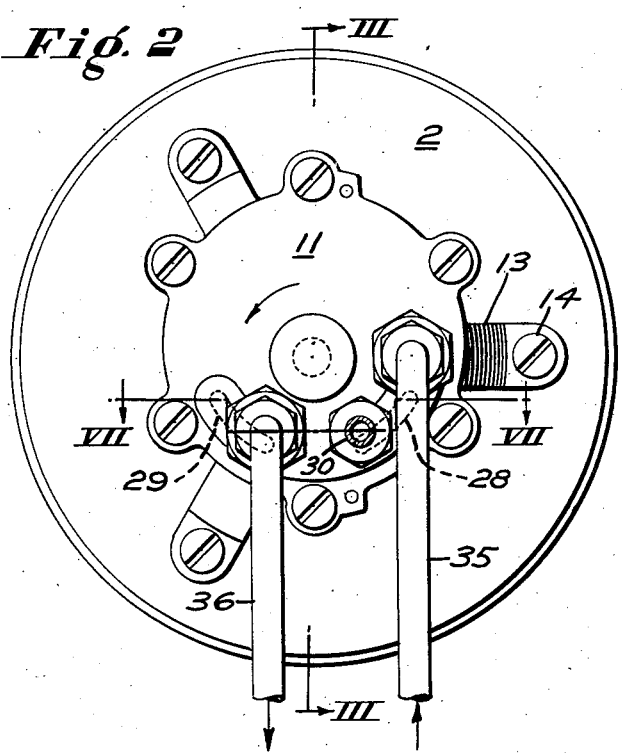
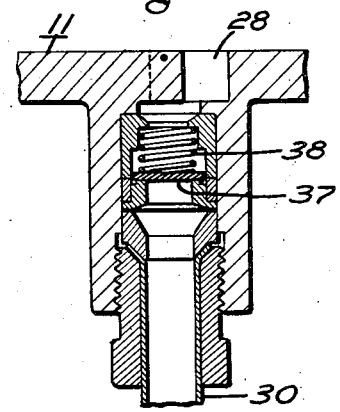
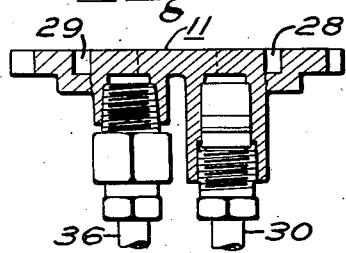
INVENTOR.
JOHN R. OISHEI
BY
Beau, Brooks, Buckley & Beau,
ATTORNEYS.

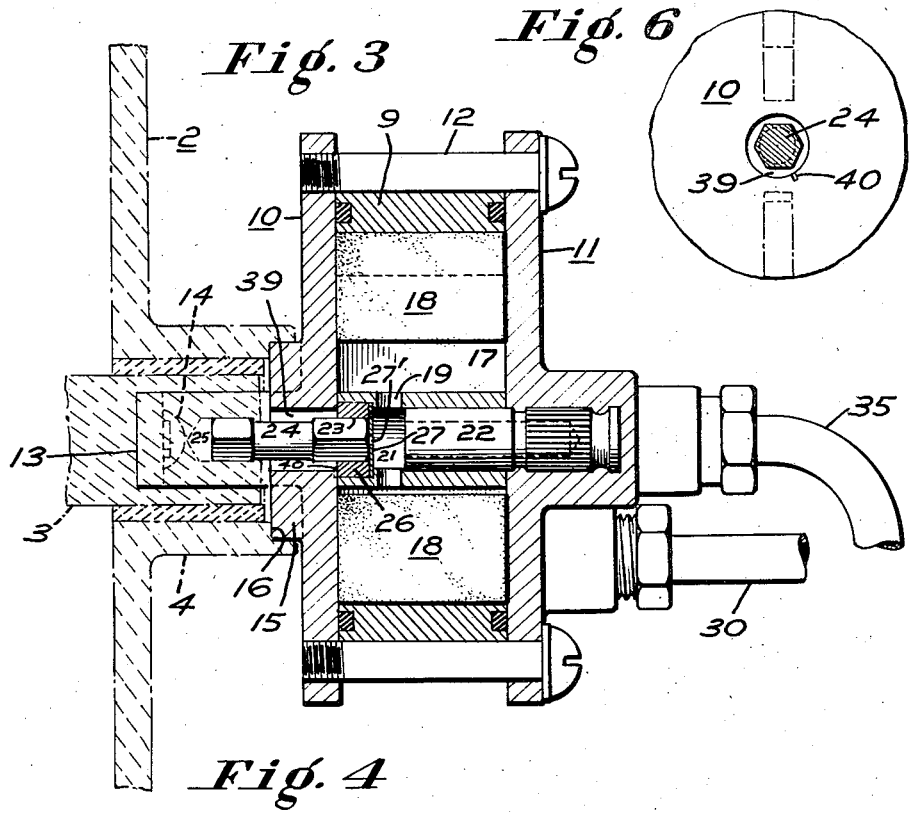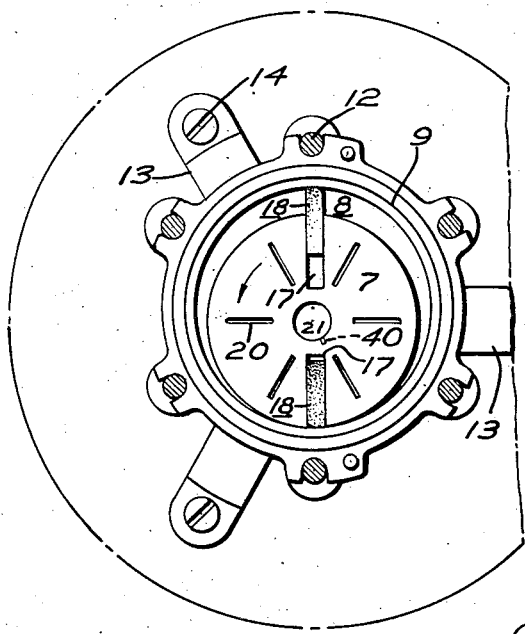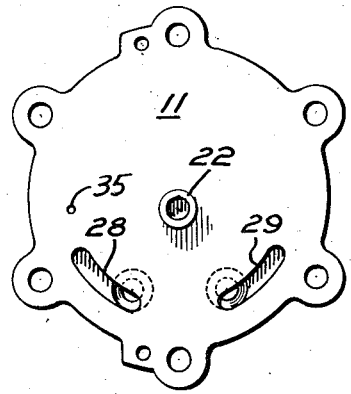

United States Patent Office 2,804,261
Patented Aug. 27, 1957

2,804,261

ACCESSORY SYSTEM AND ROTARY PUMP THEREFOR

John R. Oishei, Buffalo, N. Y., assignor to Trico Products Corporation, Buffalo, N. Y.

Application December 22, 1952, Serial No. 327,291

3 Claims. (Cl. 230—205)

This invention relates to motor vehicles and more especially to the accessory branch thereof, the primary aim being to provide a satisfactory source of suction for the operation of accessories, such as windshield cleaners.

The intake manifold of the vehicle power plant has long served as the principal supplier of sub-atmospheric pressure for the actuation of windshield cleaners, and other suction accessories, but owing to its fluctuating character it has not been wholly satisfactory and consequently, various proposals have been made to supplement, and to replace altogether, the manifold as a source. Heretofore, it has been suggested to drive a rotary type of pump from the shaft of the generator in the power plant of the vehicle, the pump embodying a bladed rotor operating within the pump chamber. This necessitated a flow of oil from the engine lubricating system to lubricate and to seal the bladed rotor against air leakage. In its operation is proved a reliable low-pressure source but the lubricant would escape out through the journal bearings, and into the generator to impair its efficiency.

The present invention resides in a pump construction that will return any escaping portion of the sealing lubricant back to the pump chamber before it can reach the generator and thereby preserve the latter for its primary functioning.

A further object of the invention is to provide a generator pump unit for the power plants of motor vehicles which will provide for durableness and effective performance over a period of long usage as a reliable air pressure supply for an accessory system.

The foregoing and other objects will manifest themselves as this description progresses, reference being made therein to the accompanying drawings, wherein Fig. 1 is a schematic view showing the motor vehicle incorporating the present invention;

Fig. 2 is an end view of the generator-equipped pump assemblage;

Fig. 3 is a fragmentary sectional view about on line 3—3 of Fig. 2 showing the oil collecting well of the present invention with fragments of generator in phantom;

Fig. 4 is a view similar to Fig. 2 but with the outer face plate removed;

Fig. 5 is an inside view of the outer face plate;

Fig. 6 is a fragmentary view of the inner face plate showing more particularly the draining groove from the oil well;

Fig. 7 is a horizontal sectional view showing the exhaust connection as well as the air inlet connection to the pump, as taken about on line 7—7 of Fig. 2; and Fig. 8 is an enlarged view of the air inlet port.

Referring more particularly to the illustrated embodiment of the present invention, the numeral 1 designates the engine of a motor vehicle power plant which latter includes an electric generator 2 with its armature shaft 3 journaled in oilless bearings 4 and carrying a pulley 5 which, in turn, is driven by a belt 6 from the engine, all in a conventional manner.

A suction generating pump has a rotor 7 journaled eccentrically within a chamber 8 of a housing which comprises a cylindrical section 9 and opposed heads or face plates 10 and 11, all secured together by bolts 12. The head section or face plate 10 has bracket parts 13 for mounting the pump on the generator frame, as by bolts 14, and also a centering boss 15 engaged within a counterbored seat 16 in the adjacent journal bearing 4.

The rotor has radial pockets 17 opening through its periphery as well as through its opposite ends, and in these pockets are vanes 18 that are slidably projected by centrifugal force to wipe against the inner peripheral wall of the chamber 8. The pockets 17 are joined by a surge passage 19 through which fluid, such as a sealing and lubricating liquid, or even a gaseous body, will surge back and forth under the pumping or displacing movements of the vanes as they advance and recede therein. As one vane is cammed inwardly by the outer wall of the chamber it will pump fluid through the surge passage into the opposite pocket to force its vane outwardly, and vice versa, such action being of positive assistance to the centrifugal force. The opposite end or side faces of the rotor may be formed with radial oil-collecting grooves 20 to throw the lubricant outwardly for maintaining a sealing ring of the same adjacent its periphery.

The rotor has an axial opening 21 therethrough to receive in one end, and there serve as a bearing for, the stub shaft or journal 22 which is fixed on the outer head 11. By reason of this arrangement the inner side of the rotor is free of the stub shaft and may, therefore, be formed with a socket 23 to receive one end of a coupling pin 24 serving as a drive shaft for the rotor. The opposite end of the pin is received in a socket 25 in the end of the armature shaft 3, the opposite ends of the pin 24 being hexagonal in cross section, or otherwise out-of-round, for operatively fitting like-shaped sockets in the shaft and rotor. This will facilitate the assembling of the component parts before tightening the bolts 14. For durableness, the sockets 23 may be formed in a hardened insert 26 which is suitably anchored in the inner end of the rotor, as by die casting the rotor about the insert 26. Likewise, the outer head 11 may be diecast about the stub shaft, or the latter may be anchored by a pressed fit. A liner disk 27 may close off the socket 23 from the surge passage 19, which latter opens across the journal bearing 21. This will tend to confine the lubricant to the pump chamber, although a small amount may be admitted through an orifice 27' into the socket 23, if desired, for easing the action of the coupling pin therein.

The outer head 11 is provided with an inlet opening 28 and an outlet opening 29 to serve as inlet and outlet ports for the pump chamber. The inlet 28 is connected by a conduit 30 leading to a point of use, such as to the suction operated windshield cleaner motor 31 which functions in a well known manner through a suitable transmission 32 to oscillate the wiper 33 over the windshield 34. The pump is lubricated by means of a conduit 35 leading from the engine crankcase to which latter the pump exhaust and the excess lubricant are returned by the outlet conduit 36. An inlet valve 37, closed by a spring 38, will guard against the lubricant finding its way over to the accessory 31 when the latter is not in use.

According to the present invention, means are provided to preclude the passage of oil from the pump over into the generator to foul the same. To this end, an oil-collecting well 39 is formed about the socket 23 and the coupling pin 24, and from this well leads a radial draining groove 40 toward the inlet side of the pump chamber. This oil retrieving groove 40 is preferably formed in the inner head 10 and extends radially a distance short of the vane pockets 17 but sufficiently close to encourage oil flow from the well back into the rotor chamber under the urge of the pressure differential existing between the oil well and the inlet side of the pump, the oil well being normally open to the atmosphere as through the mounting 15, 16, or by means of a small aperture (not shown) through the bearing 4.

In operation, the rotary pump will be operated from the generator shaft whenever the engine is in operation. This will provide a reliable source of low pressure for the operation of the accessory whenever the latter is turned on, as by a valve not shown. Rotation of the rotor will draw air in through the conduit 30 and concurrently a minute quantity of lubricant will be received through the oil conduit 35 from the engine lubricating system. Excess oil will be returned to the engine crankcase along with the air exhaust of the pump, as conveyed by the conduit 36. Any leakage oil which may collect in the oil well 39, either from around the coupling pin 24 or between the rotor and the inner head 10, will be withdrawn from the oil well through the oil-drain groove 40, and then through the clearance or space between said rotor and said inner head 10 into the intake portion of the pump chamber 8. In this connection it will be noted that the oil returning groove 40 extends toward the inlet side of the pump and opens for a portion of its length against the adjacent end face of the rotor to be wiped over thereby where it is delivered for again sealing the clearance between such end face of the rotor and the inner face of the head 10. The oil drainage from the groove 40 will be encouraged by the pressure differential existing across the relatively short gap between the low pressure in the intake side of the pump, or the inner ends of the pockets 17, and the relatively higher atmospheric pressure in the oil well. This induced flow of leakage oil will serve to preclude the escape of the lubricant over into the generator where the shaft bearings are comparatively dry to maintain the efficiency of the generator. By terminating the oil drain 40 short of the bottom of the pockets 17 the ends of the radial vanes will be preserved from dropping therein or otherwise having unnecessary wear. It will also be observed that the oil-recovering groove is provided in the head opposite to the oil supply passage 35. Consequently, the recovered oil will be returned to the pump chamber at a point where it will serve to seal the clearance at the far side of the rotor from where the main supply of sealing fluid is first delivered to the pump chamber.

The oil well serves in a practical manner to arrest the flow of leakage oil toward the generator and answers a practical problem for maintaining the generator and its bearings free of the lubricant which latter is so much desired in the pump. The arrangement acts in a positive way to return any lubricant that escapes to the oil well. Therefore while the pump is maintained in operation throughout the period of engine operation the possibilities of fouling the generator are practically removed.

The foregoing description has been given in detail for clarity and without thought of limitation since the inventive principles involved are capable of assuming other physical embodiments without departing from the spirit of the invention and the scope of the appended claims.

What is claimed is:

1. A vacuum gas pump comprising a rotor, a housing having opposed heads joined by a rotor encircling wall and defining therewith a chamber in which said rotor is journalled off-center with respect to said wall to have a portion of its periphery in oil sealed contact therewith, a gas inlet and a gas outlet for said chamber, said rotor having end faces opposing the inner faces of said heads with the space therebetween being sealed by oil, said rotor having peripheral pockets for impeller vanes slidable therein and operable to intake gas through said inlet and discharge it through said outlet, a drive shaft connection on said rotor accessible through an opening in one head for connection to a pump drive means, said opening being open to the atmosphere and comprising a well to receive sealing oil leaking from said chamber along said connection toward the pump drive means, and the adjacent inner face of said one head being formed with an oil retrieving groove leading from said opening to a point short of the inner ends of said pockets and discharging into the space between the inner face of said one head and the adjacent end face of said rotor at the inlet side of said chamber to return such leaking oil to assist in maintaining the seal.

2. A vacuum gas pump comprising a rotor, a housing having opposed heads joined by a rotor encircling wall and defining therewith a chamber in which said rotor is journalled off-center with respect to said wall to have a portion of its periphery in oil sealed contact therewith, a gas inlet and a gas outlet for said chamber, said rotor having end faces opposing the inner faces of said heads with the space therebetween being sealed by oil, a drive shaft connection on said rotor accessible through an opening in one head, said one head opening having a defining wall spaced about the drive shaft connection for opening to the atmosphere and at the same time to provide an oil well to receive sealing oil leaking from said chamber along said connection through said opening toward an associated drive, the adjacent inner face of said one head being formed with an oil retrieving groove leading from said opening and discharging into the space between the inner face of said one head and the adjacent end face of said rotor at the inlet side of said chamber to return such leaking oil to help in maintaining the seal, said groove being open along its length to said rotor for being wiped over thereby, and means for supplying sealing oil for said pump into the space between the inner face of the other head and the adjacent end face of said rotor.

3. A vacuum gas pump comprising a rotor, a housing having opposed heads joined by a rotor encircling wall and defining therewith a chamber in which said rotor is journalled off-center with respect to said wall to have a portion of its periphery in oil sealed contact therewith, a gas inlet and a gas outlet for said chamber, said rotor having end faces opposing the inner faces of said heads with the space therebetween being sealed by oil, a drive shaft connection on said rotor accessible through an opening in one head, said one head opening having a defining wall spaced about the drive shaft connection for opening to the atmosphere and at the same time to provide an oil well through which said drive shaft connection extends for collecting sealing oil escaping from said chamber through said opening toward an associated drive, and the adjacent inner face of said one head being formed with an oil retrieving groove extending from said oil well and discharging back into said chamber to help maintain the seal, said groove being open along its length for being wiped over by said rotor.

References Cited in the file of this patent

UNITED STATES PATENTS

| 848,446 | Crowell | Mar. 26, 1907 |
| 1,211,169 | Kells | Jan. 2, 1917 |
| 1,710,928 | Janca | Apr. 30, 1929 |
| 2,117,468 | Wolcott | May 17, 1938 |
| 2,147,405 | Horton | Feb. 14, 1939 |
| 2,178,425 | Johnson | Oct. 31, 1939 |
| 2,527,941 | Lauck et al. | Oct. 31, 1950 |
| 2,633,292 | Voznica | Mar. 31, 1953 |
| 2,737,341 | Bitzer | Mar. 6, 1956 |